(12) United States Patent
Piorkowski et al.

(10) Patent No.: US 8,398,025 B2
(45) Date of Patent: Mar. 19, 2013

(54) AVIONIC DOOR LOCK SYSTEM

(75) Inventors: Mitchell J Piorkowski, Mill Creek, WA (US); Paul W Bandy, Kent, WA (US); Darrell W Gaston, Jr., Everett, WA (US); Binh C Truong, Kirkland, WA (US); Dwight R Schaeffer, Mercer Island, WA (US); Shannon J Kupfer, Kirkland, WA (US); Steven D Flickinger, Arlington, WA (US); Julie M Shinn, Mukilteo, WA (US); James J Johnson, Snohomish, WA (US); Steven L Wehr, Everett, WA (US); Mark E Smith, Renton, WA (US)

(73) Assignee: The Boeing Company, Chicago, IL (US)

( * ) Notice: Subject to any disclaimer, the term of this patent is extended or adjusted under 35 U.S.C. 154(b) by 1304 days.

(21) Appl. No.: 11/041,616

(22) Filed: Jan. 24, 2005

(65) Prior Publication Data

US 2005/0178907 A1    Aug. 18, 2005

Related U.S. Application Data

(62) Division of application No. 10/100,227, filed on Mar. 18, 2002, now abandoned.

(51) Int. Cl.
 B64C 1/14      (2006.01)
 B64D 11/00    (2006.01)

(52) U.S. Cl. .................................. 244/129.5; 244/118.5

(58) Field of Classification Search ............... 244/118.5, 244/129.4, 129.5; 49/21; 454/70–74; 292/32, 292/33, 9
See application file for complete search history.

(56) References Cited

U.S. PATENT DOCUMENTS

| | | | |
|---|---|---|---|
| 3,680,499 A | 8/1972 | Boudreau | |
| 4,481,887 A | 11/1984 | Urbano | |
| 4,522,359 A * | 6/1985 | Church et al. ............. | 244/129.5 |
| 4,586,441 A | 5/1986 | Zekich | |
| 4,644,845 A | 2/1987 | Garehime | |
| 4,681,286 A | 7/1987 | Church et al. | |
| 4,741,275 A | 5/1988 | Lewiner et al. | |
| 4,847,485 A | 7/1989 | Koelsch | |
| 5,479,151 A * | 12/1995 | Lavelle et al. ................ | 340/542 |
| 5,694,867 A | 12/1997 | Diaz-Lopez | |
| 5,735,487 A | 4/1998 | Abild et al. | |

(Continued)

FOREIGN PATENT DOCUMENTS

BE          759 331 A1      5/1971

OTHER PUBLICATIONS

David Evans. "Safety: Anti-Hijacking Avionics" Avionics Magazine Nov. 2001.
FAA Memorandum. Nov. 6, 2001.
Adams Rite Aerospace, home page of website, © 2002, www.ar-aero.com (2 pages).
Adams Rite Aerospace, Cockpit Security page for Part No. AR4709/Cockpit Door Controller, © 2002, http://www.ar-aero.com/product_detail.asp?id=277 (2 pages).

(Continued)

Primary Examiner — Tien Dinh
(74) Attorney, Agent, or Firm — Harness, Dickey & Pierce, P.L.C.

(57) ABSTRACT

A security system adapted for use on an aircraft to prevent unauthorized access into a cockpit area of the aircraft via a cockpit door. The system includes a keypad accessible by individuals in a cabin area of the aircraft. A logic system is in communication with the keypad and also with a switch disposed inside the cockpit. Occupants of the cockpit, via the switch, have the ability to manually unlock the cockpit door, to deny the request for entry, or to do nothing, in which case the door will be automatically unlocked after the expiration of a predetermined time interval. A pressure sensor in communication with the controller allows the electronic door locking member to be automatically overridden, and the door immediately opened, in the event of a decompression condition occurring in the cockpit.

12 Claims, 2 Drawing Sheets

U.S. PATENT DOCUMENTS

| | | | |
|---|---|---|---|
| 5,782,511 A * | 7/1998 | Schwarz | 292/219 |
| 5,867,107 A | 2/1999 | Gartner | |
| 6,158,692 A | 12/2000 | Abild et al. | |
| 6,378,899 B1 | 4/2002 | Fujimoto | |
| 6,698,690 B2 * | 3/2004 | Novak et al. | 244/121 |
| 6,745,982 B2 * | 6/2004 | Lehmann | 244/118.5 |
| 6,866,226 B2 * | 3/2005 | Pratt et al. | 244/129.4 |
| 6,902,137 B2 * | 6/2005 | Brzeski et al. | 244/129.5 |

OTHER PUBLICATIONS

Adams Rite Aerospace, schematic of Part No. AR4709, "Cockpit System Controller," dated Apr. 11, 2002, http://www.ar-aero.com/images/upload/products/cockpit/AR4709J.pdf (1 page).

\* cited by examiner

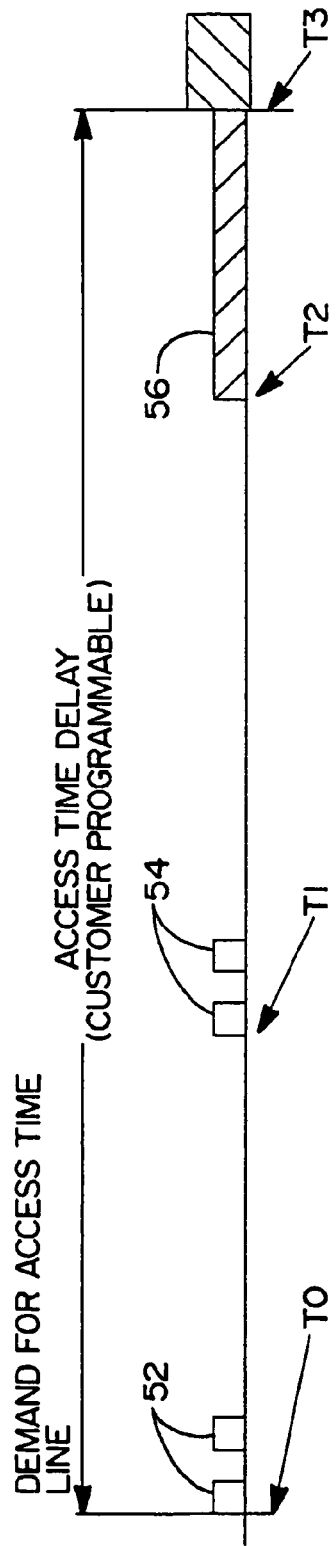

AVIONIC DOOR LOCK SYSTEM

CROSS-REFERENCE TO RELATED APPLICATIONS

This application is a divisional application of U.S. patent application Ser. No. 10/100,227 filed on Mar. 18, 2002, presently pending, the disclosure of which is incorporated herein by reference.

FIELD OF THE INVENTION

This invention relates to security systems, and more particularly to a security system adapted for use on a mobile platform such as an aircraft for preventing unauthorized entry onto the cockpit of an aircraft.

BACKGROUND OF THE INVENTION

At the present time there is an increasing need for controlling access to particular areas of mobile platforms. More specifically, there is an increasing need to control access to a cockpit of a commercial aircraft. Present day security systems often involve a simple lock or other system requiring the use of a key to unlock a door leading to a cockpit. However, such systems can be inconvenient for flight attendants who may need to periodically enter the cockpit area of an aircraft, such systems require a low force to open the door in case of decompression event.

Present day systems for preventing unauthorized access to the cockpit of a commercial aircraft through the use of a key can be forced open, and also can be foiled by an intruder if the intruder should gain access to the key. Accordingly, there is a strong need for a security system for preventing unauthorized access into a cockpit of a commercial aircraft which does not suffer from the above-described limitations.

More specifically, there is a need for a security system for use on a commercial aircraft which provides the pilot, co-pilot or other occupants of the cockpit a signal that entry into the cockpit is being requested. Such a system would ideally give the individuals in the cockpit an opportunity to make an assessment as to whether or not entry into the cockpit will be permitted either immediately, or whether entry should be denied. There is further a need for such a system which allows the pilot, co-pilot or other cockpit occupant to unlock the door separating the cockpit from the cabin area of the aircraft from a convenient location within the cockpit. Also required is the ability for the flight attendant to unlock the door after alerting the pilot and co-pilot for a pre-set time, in case the pilot and co-pilot are both incapacitated.

SUMMARY OF THE INVENTION

The above and other objects are provided by a security system in accordance with a preferred embodiment of the present invention. The security system is particularly well adapted for use in mobile platforms such as, but not limited to, commercial aircraft. The security system operates to lock a door which separates a cockpit from a passenger cabin area and to allow occupants of the cockpit to receive signals indicating that a request for entry into the cockpit has been made by an individual in the passenger cabin area of the aircraft. The system further enables an occupant of the cockpit to provide a signal to the system allowing immediate unlocking of the cockpit door, or to deny the request to unlock the door.

The security system preferably includes a pressure sensor. The pressure sensor causes the cockpit door to unlock when a difference in pressure between the cabin and cockpit is sensed.

The system generally includes a user input device which is accessible by individuals in the cabin area. In one preferred form the input device comprises a keypad. A controller incorporating a chime is disposed in the cockpit. The logic system communicates with a control device positioned for convenient use by persons in the cockpit, as well as with a lock operably associated with the cockpit door. In one preferred form, the control device comprises a multi position rotary switch.

In a preferred embodiment the multi position rotary switch provides three switch positions: an "AUTO" position, an "UNLOCK" position and a "DENY" position. An individual in the cabin area makes a request to gain entry to the cockpit by entering a predetermined access code into the keypad. It will be appreciated that the access code is a pre-programmed, restricted code that only individuals, such as flight attendants, would be apprised of in advance of entering the aircraft. When a correct access code is input to the keypad, the logic system generates an aural and visual annunciation within the cockpit apprising individuals in the cockpit that a request to enter the cockpit has been made. If the switch is in the AUTO position, the occupants of the cockpit have a predetermined time period in which to decide either to unlock the cockpit door or to deny the request to enter. If a decision is made to allow entry, the occupants may leave the switch in the AUTO position, in which case the logic system will automatically unlock the lock associated with the cockpit door at the expiration of the predetermined time interval. If the occupants decide that entry should not be permitted, then the switch can be moved to the DENY position. This signals the logic system that the request to enter is being denied. The logic system will immediately disable the keypad and prevent further entry signals from being generated within the cockpit for a predetermined time thereafter. If the occupants decide to grant immediate entry, then moving the switch to the UNLOCKED position sends a signal to the logic system that the lock to the cockpit door should be immediately unlocked. The logic system then sends a signal to a suitable device, such as a solenoid, that immediately unlocks the cockpit door. The UNLOCK position unlocks the door at any time and stops all ongoing visual and aural annunciations.

In one preferred embodiment the signal provided by the logic system is provided by a chime associated with a controller. The logic system also implements an intelligent series of time delays after a request for entry has been made at the keypad. When such a request has been made, the controller causes the chime to emit an audible signal to the occupants of the cockpit. The controller also simultaneously begins a first predetermined delay interval. If no action has been taken at the control device by any occupant of the cockpit at the expiration of the first predetermined delay interval, a second audible warning is provided by the chime and a second predetermined delay interval is commenced. At the end of the second predetermined delay interval, if still no action has been taken by any occupant via the control device to either admit or deny the request for entry, then the chime provides a continuous audible warning for a third predetermined time delay interval. At the end of the third delay interval the controller automatically sends a signal to the solenoid to unlock the lock to the cockpit door. A visual indicator also preferably flashes intermittently during the third delay interval further signaling that the cockpit door will be unlocked within a very short time if no action is taken. This operating scheme thus provides a short time period for the occupants of the cockpit to make an assessment as to whether the request for entry to the cockpit should be granted or denied. Conveniently, the door lock is automatically unlocked without intervention by the occupants of the cockpit provided the control device is in the AUTO position. The provision of both audible and visual signals virtually eliminates the possibility that the occupants of the cockpit will not realize that a request for entry has been made. It further allows automatic unlocking of the cockpit door unless an occupant of the cockpit intervenes through appropriate control of the switch.

It will be appreciated that the keypad described above does not have the capability under any circumstances to unlock the door lock of the cockpit door. The lock is controlled strictly by signals received from the switch provided in the cockpit. Accordingly, no amount of tampering with the keypad, or even the destruction of the keypad, can result in unlocking of the cockpit door once it is locked. Unlocking can be accomplished only via the multi position switch.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 2 is a timeline of the three time delay intervals implemented by the controller of the system after a request to unlock the cockpit door is received.

DETAILED DESCRIPTION OF THE PREFERRED EMBODIMENTS

Figure 1:
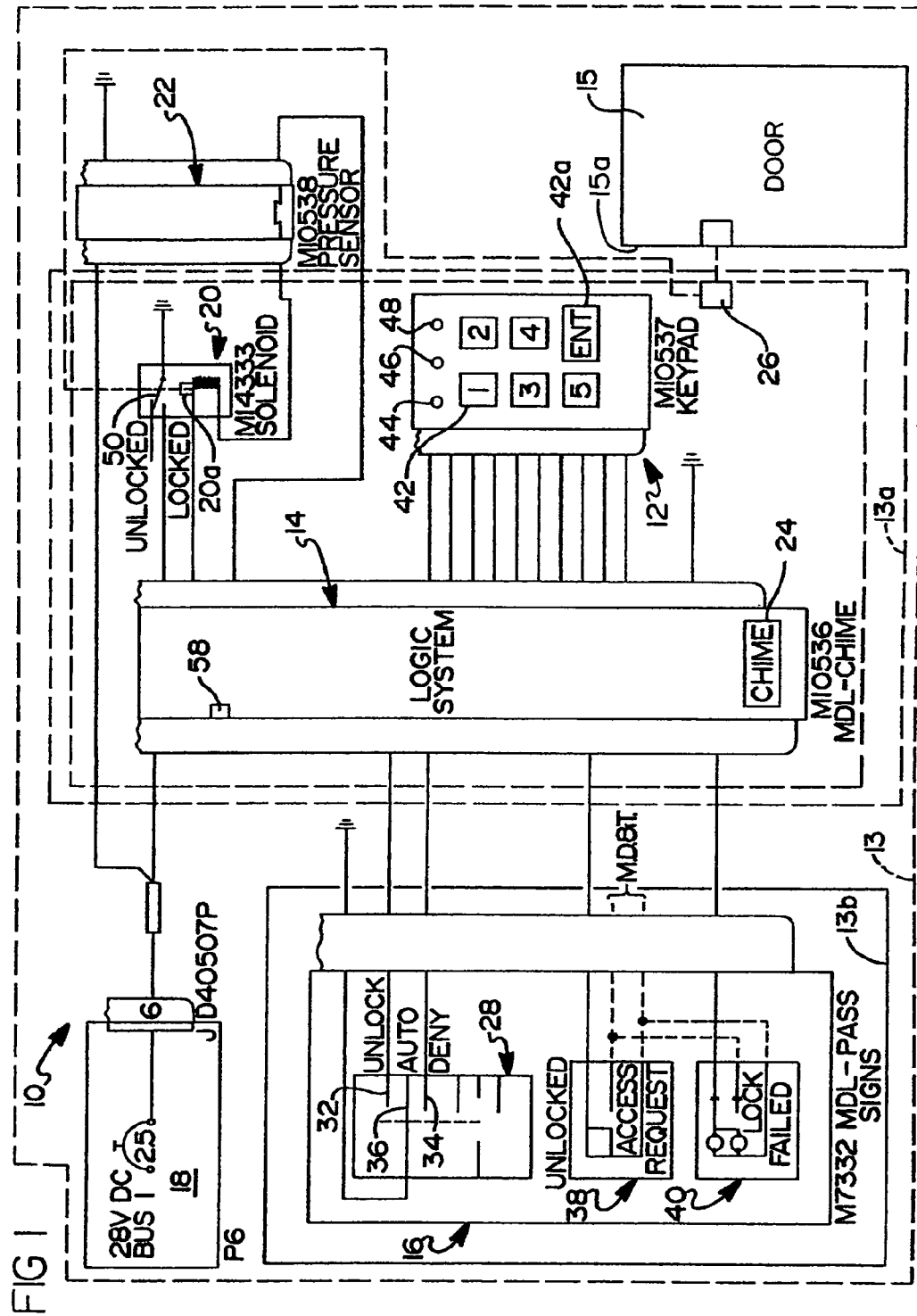
FIG. 1 is a simplified block diagram of a security system 10 in accordance with a preferred embodiment of the present invention.

The following description of the preferred embodiment(s) is merely exemplary in nature and is in no way intended to limit the invention, its application, or uses.

Referring to FIG. 1, there is shown a security system 10 for controlling access into a control center of a mobile platform. In the following description, the mobile platform will be referred to as a commercial aircraft and the control center will be referred to as the cockpit of the aircraft. It will be appreciated, however, that the system 10 of the present invention is equally applicable to non-moving structures where it is desired to closely control access to a sensitive area of the structure. It is anticipated that the invention may also find applications on other mobile platforms such as ships or even buses. The system 10 advantageously includes only a limited number of independent component parts making it easily retrofitable to existing commercial or other types of aircraft.

Referring further to FIG. 1, the system 10 generally includes a user input device in the form of a keypad 12 which is disposed in the passenger cabin area 13a of an aircraft 13, and in one preferred location on a door post assembly 15a adjacent a door 15 of the aircraft 13 facing the passenger cabin area. However, the keypad 12 may be placed in virtually any location where it can be conveniently accessed by flight crew members who may need to gain periodic access to the cockpit 13b of the aircraft 13.

The keypad 12 is in communication with a logic system 14. The logic system 14, in turn, is in communication with a control device 16, a circuit breaker 18 and a door lock solenoid 20. An ambient air pressure sensor 22 disposed in a cockpit 13b of the aircraft 13 communicates with the door lock solenoid 20 and the logic system 14. The door lock solenoid 20 is operably associated with a door lock 26 for the cockpit door 15, as will be described in greater detail momentarily.

The logic system 14 comprises a suitable controller, and more preferably an 8-bit controller. Advantageously, the controller 14 includes a chime 24 which is used to generate an audible signal within the cockpit 13b of the aircraft 13. The control device 16 is also disposed in the cockpit 13b and may be mounted on an overhead panel, in an aisle stand panel or at any other conveniently accessible location in the cockpit 13b.

In a preferred embodiment the control device 16 comprises a multi position rotary switch 28 having a first switch position 30 designated as the "AUTO" position, a second switch position designated the "UNLOCK" position and a third switch position 34 designated as the "DENY" position. The switch 28 comprises a manually engageable switch element 36 which is spring biased normally into the AUTO position. The switch element 36 can be moved momentarily into either the UNLOCK position or the DENY position. As soon as the switch element 36 is released, however, it is biased back to the AUTO position. An "UNLOCK" indicator light 38 is also disposed closely adjacent the switch 28, as is a "LOCK FAILED" indicator light 40. The UNLOCK indicator light 38 is illuminated when a predetermined access code has been correctly entered into the keypad 12, as will be described in greater detail momentarily. The LOCK FAILED indicator light 40 indicates that the solenoid 20 has not unlocked the lock 26 of the cockpit door 15.

The keypad 12 comprises a plurality of numeric keys 42 and an enter key 42a, a first indicator light 44, a second indicator light 46 and a third indicator light 48. The first indicator light 44 preferably comprises a red LED for indicating that the door lock 26 is in a locked condition. Second indicator light 46 preferably comprises an amber LED which is illuminated when a user inputs the predetermined access code correctly via the keys 42 and 42a. Third indicator light 48 preferably comprises a green LED which signals that the solenoid 20 has unlocked the door lock 26.

The solenoid 20 includes a microswitch 50 for sensing the position of a plunger 20a of the solenoid 20. Accordingly, the controller 14 can verify that the plunger 20a has been moved into the locked position when the solenoid 20 is energized. This provides an additional degree of security in the event the solenoid 20 fails and the plunger 20a is not moved into the "LOCKED" position. In such instance, the LOCK FAILED indicator light 40 will be illuminated by the controller 14 to provide an immediate visual indication of such a condition to the occupants of the cockpit 13b.

The ambient air pressure sensor 22 is used to detect a drop in pressure in the cockpit 13b when the cockpit door 15 is closed. Such a condition might occur, for example, if the windshield of the aircraft 13 was broken. In such a situation, it would be necessary to immediately unlock the cockpit door 15 to prevent complete decompression of the cockpit 13b. The pressure sensor 22 is thus used to detect a drop in pressure within the cockpit 13b and to immediately signal this event by deenergizing the solenoid 20.

Referring to FIG. 2, a description will now be provided of the predetermined time delay sequence that is implemented by the controller 14. "T0" represents the instant that a user correctly enters the predetermined access code via the keypad 12. This code preferably comprises a three to eight digit numeric code. It is provided to flight attendants or other individuals, prior to entering the aircraft, who may have a need to periodically enter the cockpit 13b while the aircraft 13 is in operation. Immediately after receiving the correct access code, the controller 14 causes the chime 24 to generate an audible signal represented by pulses 52. Pulses 52 represent two "beeps" or other short duration audible signals which immediately apprises the individuals in the cockpit 13b that a request for access to the cockpit has just been made. At T0, a first predetermined delay interval is commenced which extends in to "T1". At T1, if the controller 14 has not received either in UNLOCK or a DENY command via the switch 28 (i.e., the switch 28 has not been moved to either of these positions), then the controller causes the chime 24 to again provide audible signals, represented by pulses 54, to remind the occupants of the cockpit 13b that someone is requesting access to the cockpit. T1 represents the expiration of the first delay interval and the beginning of a second delay interval.

At "T2", if the switch 28 still has not been moved out of the AUTO position during the second delay interval, then the controller 14 causes a third delay interval to be commenced. At T2 the controller 14 causes the UNLOCKED indicator light 38 to be continuously illuminated and the chime 24 is caused to output a continuous audible alert, represented by waveform 56, that the lock 26 of the door 15 will be unlocked within a very short time period if no operator action is taken via the switch 28. At any time, an occupant in the cockpit 13b may move the switch element 36 of the switch 28 to the UNLOCK position 32, which signals the controller 14 to turn off the chime 24 and the UNLOCKED indicator light 38, as well as to command solenoid 20 to unlock the lock 26. Also at any time during the first delay interval, the second delay interval or the third delay interval, an occupant in the cockpit 13b may move the switch element 36 to the DENY position 34. This signals the controller 14 to turn off the chime 24 and the UNLOCKED indicator light 38, and further inhibits operation of the keypad 12 for a predetermined time thereafter. This predetermined time may vary but is preferably for a time interval of between five minutes to thirty minutes. During this time, if an individual should again correctly enter the access code into the keypad 12, no audible or visual signals would be provided by the chime 24 or UNLOCKED indicator light 38. After the expiration of this time period, then the user may again input the access code into the keypad 12 and make another request to access the cockpit 13b.

At T3, as long as no operator selection has been made via the switch 28 (i.e., meaning that the switch element 36 has remained in the AUTO position 30), the controller 14 causes the solenoid 20 to be deenergized. This causes the door lock 26 to be unlocked. Thereafter, manual actuation of the door handle of the cockpit door 15 will allow the door to be opened.

In the preferred embodiment described above, the delay interval between T0 and T3 is user programmable from about 15 seconds to about 120 seconds in 15 second increments. Preferably, the delay interval between T2 and T3 has a minimum duration of at least 10 seconds. The audible signals represented by pulses 52 and 54 preferably comprise 0.5 second duration audible signals having a frequency of preferably around 500 Hz at approximately 75 dB. It will be appreciated, however, that the duration, frequency and intensity of these audible signals may be modified to suit user preferences.

The UNLOCKED indicator light 38, when flashing during the third delay interval, preferably flashes at a 50% to 60% duty cycle, with 60% being the more preferred duty cycle. Again, however, the frequency at which this light flashes may be tailored to suit user preferences.

When the lock 26 of the cockpit door 15 is unlocked at point T3, the door is preferably maintained in the unlocked position for a predetermined time interval, and more preferably for at least about five seconds. Again, this delay interval could also be modified. During this time period the solenoid 20 remains deenergized. After this short time interval expires, the controller 14 again automatically energizes the solenoid 20 to cause the lock 26 to lock the door 15.

The access code is preferably changeable from the controller 14. This is accomplished by engaging a "PROGRAM" key 58 on the controller 14 as indicated in FIG. 1. Once this key is depressed, a new access code can be entered at the keypad 12.

Another optional feature which may be implemented is a "door bell" mode. This mode may be implemented by selecting a particular key, such as the "1" key on the keypad 12, followed by the "ENTER" key 42a. This causes the chime 24 to generate an audible signal but does not begin the time delay period represented between T0 and T3. In effect, the occupants of the cockpit 13b are simply apprised that an individual in the cabin area 13a of the aircraft 13 is requesting access to the cockpit. The audible signal may comprise one or more short duration signals by the chime 24.

The system 10 of the present invention thus provides a means by which individuals in the cabin area of the aircraft can request access to the cockpit, and can further initiate a process by which a locked cockpit door will be automatically unlocked if no intervention is taken by occupants of the cockpit. The inclusion of the pressure sensor also ensures that in the event of a decompression condition occurring in the cockpit, the cockpit door will be automatically and immediately unlocked so that the door can be quickly opened. Importantly, the system 10 provides the occupants of the cockpit with the ultimate authority to deny the requested access if circumstances are such that the cockpit occupants believe that the cockpit should remain secure from all individuals in the cabin area.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A system for sensing a decompression event within an interior area of a pressurized structure, wherein the interior area is partitioned into at least two compartments by a wall having a door, wherein the door is movable between an open position and a closed position, and held in said closed position in either an unlocked or a locked condition, the system comprising:

an electronic locking mechanism disposed adjacent said door for allowing said door to be maintained in said locked and unlocked conditions when positioned in said closed position, the electronic locking mechanism including:
a control device within one of the two compartments;
a controller responsive to said control device to maintain said door in said locked and unlocked positions;
a pressure sensor for sensing a decompression event, the pressure sensor generating an output that electrically inhibits the electronic locking mechanism, substantially instantaneously, from holding the door in a closed position, thus allowing the door to open substantially simultaneously in response to said decompression event;

a user keypad operably associated with said electronic locking mechanism for enabling a user in a first one of said compartments to request from an individual in a second one of said compartments that said door be unlocked, independently of operation of said pressure sensor; and said control device signals said controller to automatically unlock said door after a predetermined time delay period has expired, said predetermined time delay period including at least a first predetermined delay interval which commences when a user requests that said door be unlocked and the user enters a correct input to the user keypad after which said controller produces at least one short duration audible signal during said first predetermined delay interval that indicates to the individual that a request to unlock said door has been made, a second predetermined delay interval during which said controller produces a second audible signal and a continuous visual indicator to the individual that said controller will automatically unlock said door at an expiration of said predetermined time delay, and a third predetermined delay interval in which said controller produces a continuous audible signal and a continuously flashing visual indicator that is continuous throughout the third predetermined delay interval that indicates to the individual that said controller will automatically unlock said door at the expiration of said predetermined time delay period.

2. The system of claim 1, wherein said electronic locking mechanism includes a solenoid, and wherein the solenoid includes a plunger to assist in holding the door in said closed position.

3. The system of claim 1, wherein said output of said pressure sensor de-energizes said solenoid to inhibit operation of said locking mechanism and allowing said door to be opened.

4. The system of claim 1, wherein said controller is responsive to said output of said pressure sensor.

5. The system of claim 4, further comprising at least one of a visual indicator and an audible indicator located in said first compartment for providing a signal to an individual in said first compartment that an individual in said second compartment has requested that said door be unlocked.

6. A system for sensing a decompression event within a pressurized interior area of a mobile platform, wherein the interior area is partitioned into at least two compartments by a wall having a door, and wherein the door is moveable between an open position and a closed position, the system comprising:

an electronic locking mechanism for allowing said door to be held, when in said closed position, in locked and unlocked conditions, said electronic locking mechanism including:
a control device within one of the two compartments;
a controller responsive to said control device to maintain said door in said locked and unlocked positions;
a pressure sensor for sensing a decompression event within at least one of said compartments;
the pressure sensor generating an electrical output that electrically inhibits the electronic locking mechanism to thus allow the door to open substantially simultaneously in response to said decompression event, and without user intervention;

a keypad in communication with said controller for enabling an individual to request that said door lock mechanism be placed in said unlocked condition;

said control device signals said controller to automatically unlock said door after a predetermined time delay period has expired, said predetermined time delay period including at least a first predetermined delay interval which commences when a user requests that said door be unlocked in which said controller produces a first signal to the individual that a request to unlock said door has been made, and a second predetermined delay interval during which said controller produces a second signal to the individual that said controller will automatically unlock said door at an expiration of said predetermined time delay; and said controller includes a program key that enables access code associated with requesting said door be unlocked to be programmed, via said keypad.

7. The system of claim 6, wherein said electronic locking mechanism includes a solenoid having a plunger for assisting in operation of said locking mechanism; and
wherein the solenoid is responsive to said output from said pressure sensor.

8. The system of claim 6, wherein said controller is responsive to said output of said pressure sensor for monitoring operation of said door locking mechanism.

9. The system of claim 8, further comprising using a visual indicator in communication with said controller to provide a visual signal to a first individual within one of said compartments that a request to unlock said door has been made by a second individual in the other one of said compartments.

10. The system of claim 6, wherein said predetermined time delay further comprises a third predetermined delay interval in which said controller substantially continuously produces an audible signal and a visual indicator to the individual that said controller will automatically unlock said door at the expiration of said predetermined time delay.

11. The system of claim 6, wherein said predetermined time delay period is programmable.

12. A system for sensing a decompression event within an interior area of a pressurized structure, wherein the interior area is partitioned into at least two compartments by a wall having a door, wherein the door is movable between an open position and a closed position, and held in said closed position in either an unlocked or a locked condition, the system comprising:

an electronic locking mechanism disposed adjacent said door for allowing said door to be maintained in said locked and unlocked conditions when positioned in said closed position, the electronic locking mechanism including:
a control device within one of the two compartments;
a controller responsive to said control device to maintain said door in said locked and unlocked positions;
a pressure sensor for sensing a decompression event, the pressure sensor generating an output that electrically inhibits the electronic locking mechanism, substantially instantaneously, from holding the door in a closed position, thus allowing the door to open substantially simultaneously in response to said decompression event;

a user keypad operably associated with said electronic locking mechanism for enabling a user in a first one of said compartments to request from an individual in a second one of said compartments that said door be unlocked, independently of operation of said pressure sensor; and said control device signals said controller to automatically unlock said door after a predetermined time delay period has expired, said predetermined time delay period including at least a first predetermined delay interval which commences when a user requests that said door be unlocked in which said controller produces a first signal to the individual within said second one of said compartments that a request to unlock said door has been made, a second predetermined delay interval during which said controller produces a second signal to the individual within said second one of said compartments that said controller will automatically unlock said door at an expiration of said predetermined time delay, and a third predetermined delay interval in which said controller continuously produces a third signal to the individual within said second one of said compartments throughout the third predetermined delay interval that said controller will automatically unlock said door at the expiration of said predetermined time delay.

* * * * *